United States Patent
Patil et al.

(10) Patent No.: US 10,526,974 B2
(45) Date of Patent: Jan. 7, 2020

(54) DECOUPLER ASSEMBLY FOR ENGINE STARTER

(71) Applicant: Unison Industries, LLC, Jacksonville, FL (US)

(72) Inventors: Sharad Pundlik Patil, Bangalore (IN); Subrata Nayak, Bangalore (IN); Shiloh Montegomery Emerson Meyers, Dayton, OH (US); David Allan Dranschak, Union, OH (US); Eliel Fresco Rodriguez, Springboro, OH (US)

(73) Assignee: UNISON INDUSTRIES, LLC, Jacksonville, FL (US)

(*) Notice: Subject to any disclaimer, the term of this patent is extended or adjusted under 35 U.S.C. 154(b) by 180 days.

(21) Appl. No.: 15/676,464

(22) Filed: Aug. 14, 2017

(65) Prior Publication Data
US 2019/0048800 A1 Feb. 14, 2019

(51) Int. Cl.
| F02C 7/277 | (2006.01) |
| F16D 9/06 | (2006.01) |
| F01D 15/12 | (2006.01) |
| F16D 9/08 | (2006.01) |
| F01D 25/24 | (2006.01) |

(Continued)

(52) U.S. Cl.
CPC ............. *F02C 7/277* (2013.01); *F01D 15/12* (2013.01); *F01D 25/34* (2013.01); *F16D 9/06* (2013.01); *F16D 9/08* (2013.01); *F01D 19/00* (2013.01); *F01D 25/24* (2013.01); *F05D 2260/311* (2013.01); *F05D 2260/36* (2013.01); *F05D 2260/38* (2013.01); *F05D 2260/40* (2013.01); *F05D 2260/85* (2013.01)

(58) Field of Classification Search
CPC . F02C 7/277; F16D 9/06; F01D 15/12; F01D 25/24; F05D 2260/40; F05D 2260/311; F05D 2260/36; F05D 2260/38; F05D 2260/85
USPC .......................................................... 415/9
See application file for complete search history.

(56) References Cited

U.S. PATENT DOCUMENTS

| 3,536,174 A * | 10/1970 | Vance ...................... F16D 9/06 192/56.53 |
| 4,417,881 A | 11/1983 | Dyson |

(Continued)

FOREIGN PATENT DOCUMENTS

EP    3404234 A1    11/2018

OTHER PUBLICATIONS

Combined Search and Examination Report issued in related United Kingdom Patent Application No. 1813228.2, 6 pages, Feb. 12, 2019, The Ark, Hammersmith, London.

*Primary Examiner* — Joseph J Dallo
*Assistant Examiner* — Scott A Reinbold
(74) *Attorney, Agent, or Firm* — McGarry Bair PC

(57) ABSTRACT

An air turbine starter for starting an engine, comprising a housing defining an inlet, an outlet, and a flow path extending between the inlet and the outlet for communicating a flow of gas there through. A turbine member is journaled within the housing and disposed within the flow path for rotatably extracting mechanical power from the flow of gas. A gear train is drivingly coupled with the turbine member, a drive train is operably coupled with the gear train, and an output shaft is selectively operably coupled to rotate with the engine via a decoupler.

18 Claims, 10 Drawing Sheets

(51) Int. Cl.
*F01D 25/34* (2006.01)
*F01D 19/00* (2006.01)

(56) References Cited

U.S. PATENT DOCUMENTS

| | | | |
|---|---|---|---|
| 4,452,567 A | 6/1984 | Treby et al. | |
| 4,543,074 A * | 9/1985 | Ville | F16D 9/06 |
| | | | 192/56.53 |
| 4,688,744 A | 8/1987 | Aldrich | |
| 4,765,145 A | 8/1988 | Hines | |
| 4,871,296 A * | 10/1989 | Laessle | F02C 7/277 |
| | | | 415/123 |
| 6,059,085 A | 5/2000 | Farnsworth | |
| 7,850,532 B2 | 12/2010 | Scherzinger et al. | |
| 2014/0318144 A1 | 10/2014 | Lazzeri et al. | |
| 2015/0082805 A1 | 3/2015 | Zeiner et al. | |

* cited by examiner

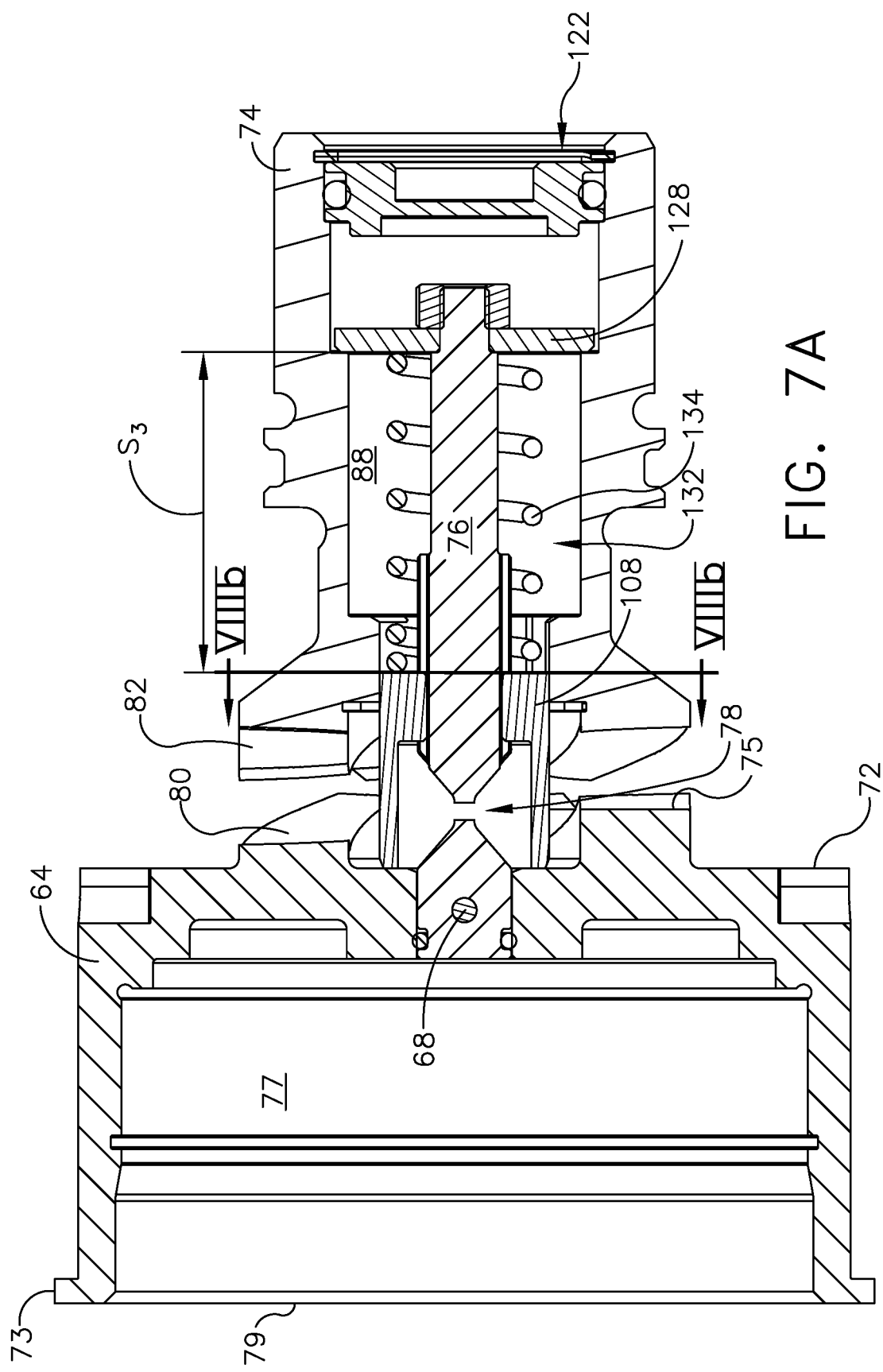

DECOUPLER ASSEMBLY FOR ENGINE STARTER

BACKGROUND OF THE INVENTION

An aircraft engine, for example a gas turbine engine, is engaged in regular operation to an air turbine starter. The internal components of both the gas turbine engine and the air turbine starter spin together and can each include gearboxes allowing for step down or step up ratios between consecutive parts. To prevent back drive, an overrunning clutch is placed between the air turbine starter output shaft and the air turbine starter gearbox section. Back drive events can occur with an overrunning clutch failure in the engaged position, when the engine drives the output shaft of the air turbine starter resulting in over spinning a turbine rotor in the air turbine starter. In a back drive event, it can be desirable to decouple the air turbine starter from the gas turbine engine.

BRIEF DESCRIPTION OF THE INVENTION

In one aspect, the present disclosure relates to an air turbine starter for starting an engine, comprising a housing defining an inlet, an outlet, and a flow path extending between the inlet and the outlet for communicating a flow of gas there through. A turbine member is journaled within the housing and disposed within the flow path for rotatably extracting mechanical power from the flow of gas, a gear train drivingly coupled with the turbine member. A drive train is operably coupled with the gear train and configured to provide a rotational output. A decoupler, includes a drive hub operably coupled to the drive train and having a first set of teeth, an output shaft having a first end having a second set of teeth configured to mate with the first set of teeth and a second end selectively operably coupled to the engine, the second set of teeth allow for driving torque transfer from the drive hub to the output shaft and the second set of teeth slide on the first set of teeth when back driving torque is transmitted such that the output shaft is moved axially away from the drive hub, a shear pin operably coupled at a first end to the drive hub and operably coupled at a second end to the output shaft and having a shear fuse, and a sheath surrounding at least a portion of the shear pin and axially moveable along a portion of the shear pin. During normal operation a load path for torque transmission is through the drive hub and output shaft and during a failure event the shear pin is loaded from the output shaft via the sheath and loading past a threshold shears the shear fuse.

In another aspect the present disclosure relates to an air turbine starter for starting an engine, comprising a housing defining an inlet, an outlet, and a flow path extending between the inlet and the outlet for communicating a flow of gas there through, a turbine member journaled within the housing and disposed within the flow path for rotatably extracting mechanical power from the flow of gas, a gear train drivingly coupled with the turbine member. A drive train is operably coupled with the gear train and includes an output end. A decoupler, includes a drive hub operably coupled to the drive train and having a first set of teeth, an output shaft defining an interior and having a first end having a second set of teeth configured to mate with the first set of teeth and a second end selectively operably coupled to the engine, the second set of teeth allow for driving torque transfer from the drive hub to the output shaft and the second set of teeth slide on the first set of teeth when back driving torque is transmitted such that the output shaft is moved axially away from the drive hub, a shear pin at least partially located within the interior of the output shaft and having a first end operably coupled to the drive hub and a second end housed within the interior of the output shaft and having a shear fuse, a sheath at least partially located within the interior of the output shaft and having a first end adjacent the drive hub and a second end mating with a portion of the shear pin and through which the shear pin extends. A biasing mechanism is configured to compress during back driving and retain the sheath on the drive hub. During a failure state the output shaft rotates to a second rotational orientation and the sheath is configured to move axially within the output shaft and is pushed towards the drive hub by the biasing mechanism and when in the second rotational orientation the sheath loads the shear pin and further loading results in shearing of the shear fuse.

BRIEF DESCRIPTION OF THE DRAWINGS

In the drawings:

FIG. 7A is a cross-sectional view of the decoupler assembly of FIG. 2 in a decoupled position.

DETAILED DESCRIPTION OF THE EMBODIMENTS

Figure 1:
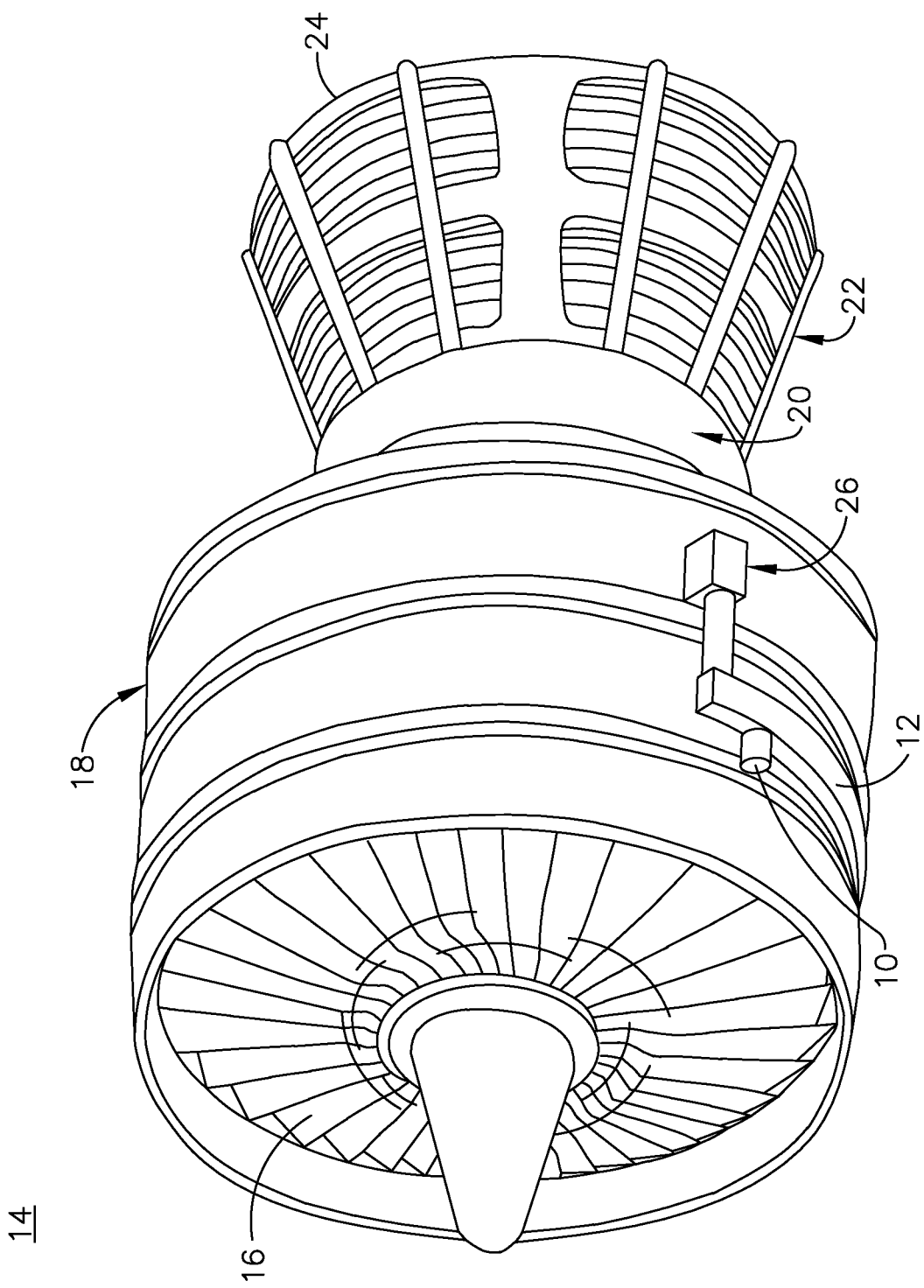
FIG. 1 is a schematic isometric view of a turbine engine with an accessory gearbox and a starter.

The present disclosure is related to a driving mechanism generating kinetic motion in the form of a rotating shaft coupled with a piece of rotating equipment. One non-limiting example is coupling a starter containing more than one component onto an accessory gear box of a turbine engine. The starter can have various applications including starting the turbine engine. While the examples described herein are directed to application of a turbine engine and a starter, the disclosure can be applied to any implementation of a driving mechanism that generates rotational motion at a driving output and provides the rotational motion to another piece of rotating equipment.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline. Additionally, as used herein, the terms "radial" or "radially" refer to a dimension extending between a center longitudinal axis of the engine and an outer engine circumference. It should be further understood that "a set" can include any number of the respectively described elements, including only one element.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The turbine engine can be a turbofan engine, such as a General Electric GEnx or CF6 series engine, commonly used in modern commercial and military aviation or it could be a variety of other known turbine engines such as a turboprop or turboshaft. The turbine engine can also have an afterburner that burns an additional amount of fuel downstream of the low pressure turbine region 24 to increase the velocity of the exhausted gases, and thereby increasing thrust.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high pressure compression region 18.

Figure 2:
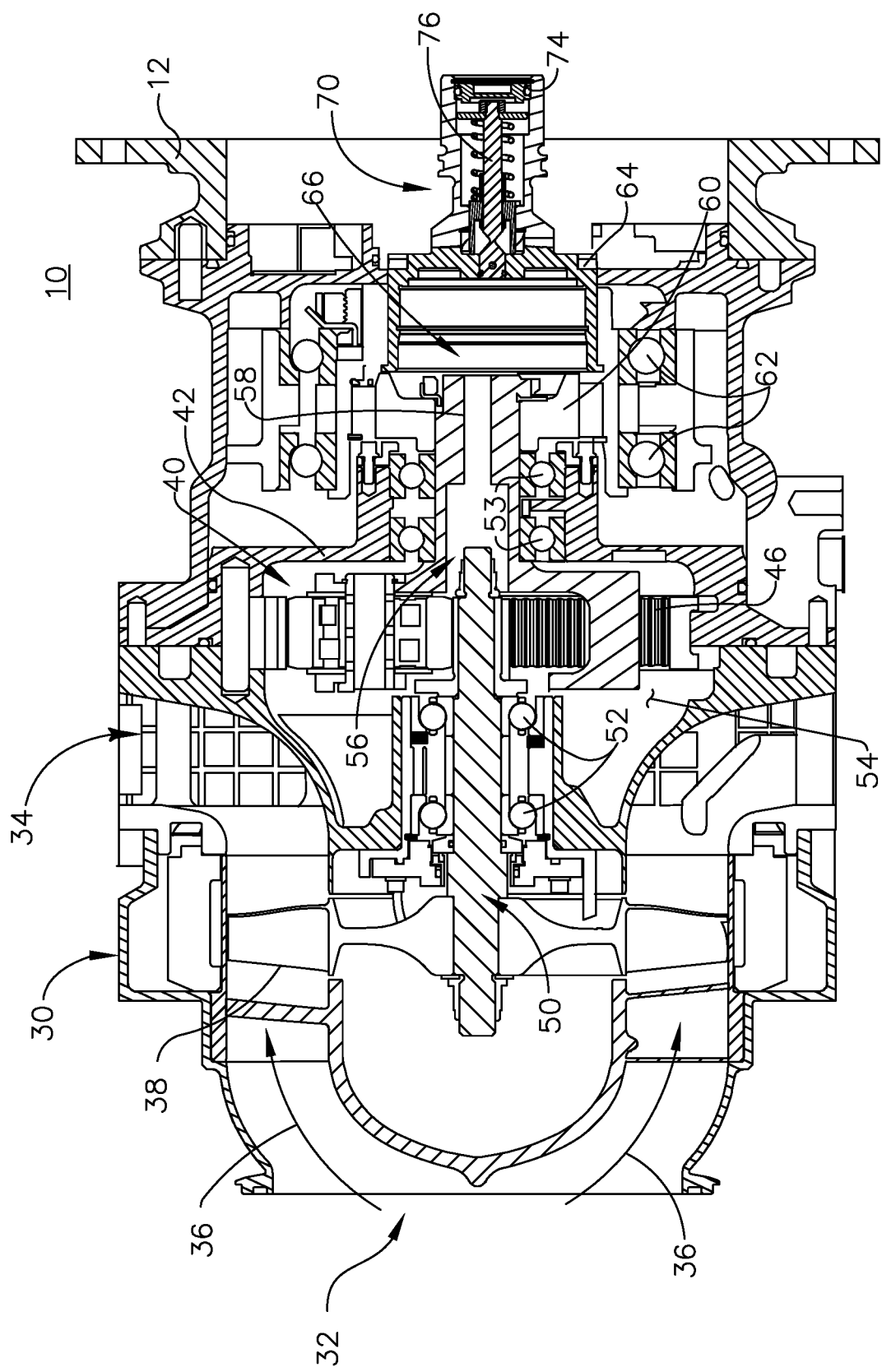
FIG. 2 is an enlarged cross-sectional view of the starter of FIG. 1 including a decoupler assembly.

Referring now to FIG. 2, the air turbine starter 10, which can be mounted to the AGB 12 is shown in greater detail. Generally, the air turbine starter 10 includes a housing 30 defining an inlet 32, an outlet 34, and a flow path 36 extending between the inlet 32 and outlet 34 for communicating a flow of gas there through. In one non-limiting example the gas is air and is supplied from either a ground-operating air cart, an auxiliary power unit, or a cross-bleed start from an engine already operating. The air turbine starter 10 includes a turbine member 38 journaled within the housing 30 and disposed within the flow path 36 for rotatably extracting mechanical power from the flow of gas along the flow path 36. A gear box 42 is mounted within the housing 30. Further, a gear train 40, disposed within the gear box 42 and drivingly coupled with the turbine member 38, can be caused to rotate.

The gear train 40 includes a ring gear 46 and can further comprise any gear assembly including for example but not limited to a planetary gear assembly or a pinion gear assembly. A turbine shaft 50 couples the gear train 40 to the turbine member 38 allowing for the transfer of mechanical power to the gear train 40. The turbine shaft 50 is coupled to the gear train 40 and rotatably supported by a pair of turbine bearings 52. The gear train 40 is supported by a pair of carrier bearings 53. The gear box interior 54 can contain a lubricant, including, but not limited to, a grease or oil to provide lubrication and cooling to mechanical parts contained therein such as the gear train 40, ring gear 46, and bearings 52, 53.

There is an aperture 56 in the gear box 42 through which the turbine shaft 50 extends and meshes with a carrier shaft 58 to which a clutch 60 is mounted and supported by a pair of spaced bearings 62. A drive hub 64 extends from the gear box 42 and is coupled to the clutch 60 and additionally supported by the pair of spaced bearings 62. The drive hub 64 is driven by the gear train 40 and coupled to the AGB 12 to provide a rotational output, such that during a starting operation the drive hub 64 provides a driving motion to the AGB 12.

The clutch 60 can be any type of shaft interface portion, by way of non-limiting example a sprag clutch that forms a single drive train 66 comprising the turbine shaft 50, the carrier shaft 58, and the drive hub 64. The shaft interface portion can be by any known method of coupling including, but not limited to, gears, splines, a clutch mechanism, or combinations thereof. An example of a shaft interface portion is disclosed in U.S. Pat. No. 4,281,942 to General Electric and is incorporated herein by reference in its entirety.

The starter 10 can be formed by any materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the air turbine starter 10 and, therefore, the aircraft.

The drive train 66 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive hub 64 can be fixed or vary along the length of the drive train 66. The diameter can vary to accommodate different sizes, as well as rotor to stator spacing.

As described herein, air supplied along the flow path 36 rotates the turbine member 38 for driving the rotation of the rotating shafts 50, 58, 64. Therefore during starting operations, the starter 10 can be the driving mechanism for the turbine engine 14 via rotation of the rotating shafts 50, 58, 64. The non-driving mechanism, that is, the equipment being driven by the driving mechanism, can be understood as rotating equipment utilizing the rotational movement of the rotating shafts 50, 58, 64, for example to generate electricity in the starter 10.

The drive hub 64 is further coupled to a decoupler assembly 70 having an output shaft 74. The output shaft 74 is configured to be operably coupled to and rotate with the engine 14. A shear pin 76 is coupled to the output shaft 74 and extends into the drive hub 64 and is coupled thereto.

Figure 3:
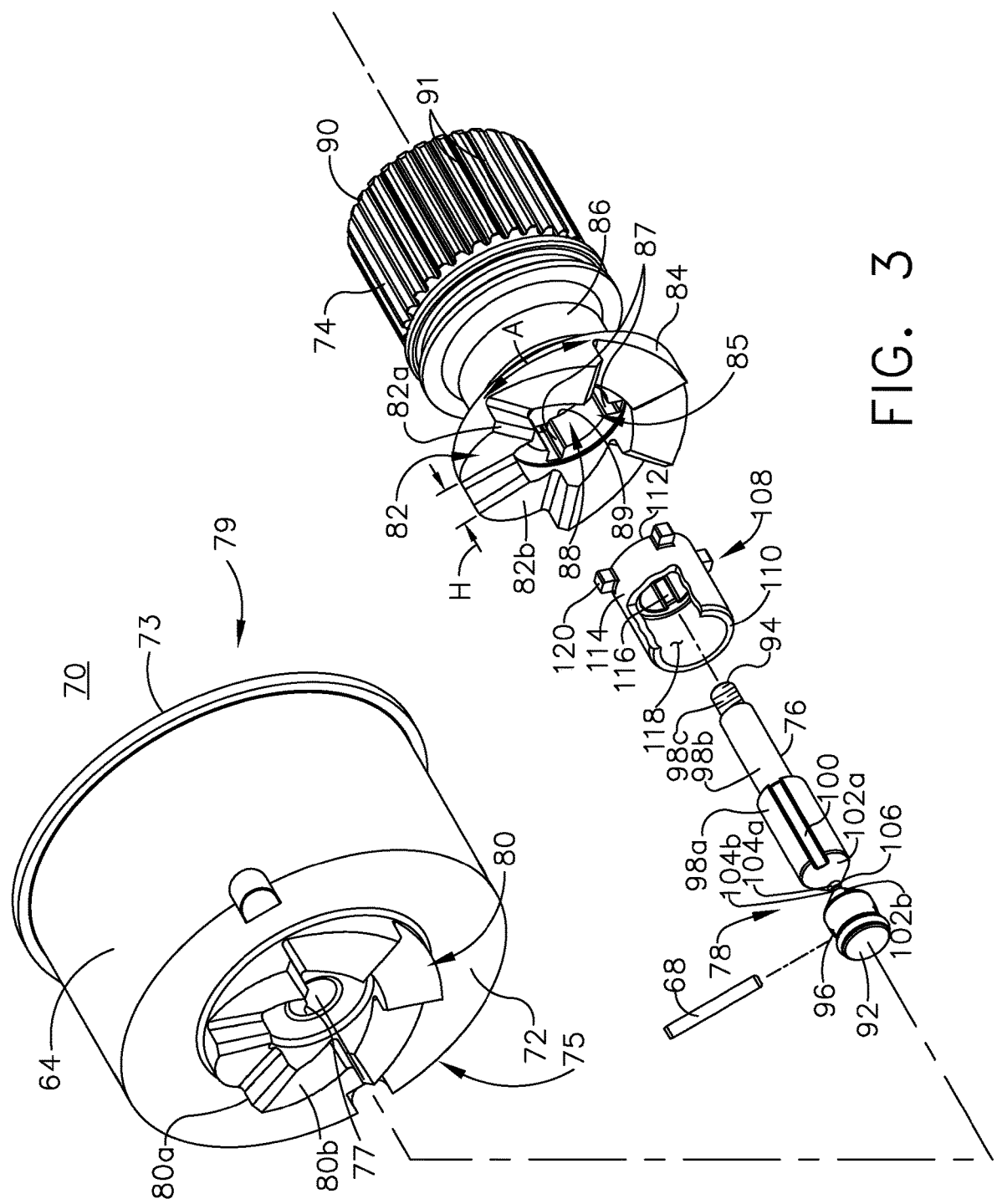
FIG. 3 is an exploded view of the decoupler assembly in FIG. 2.
Figure 4:
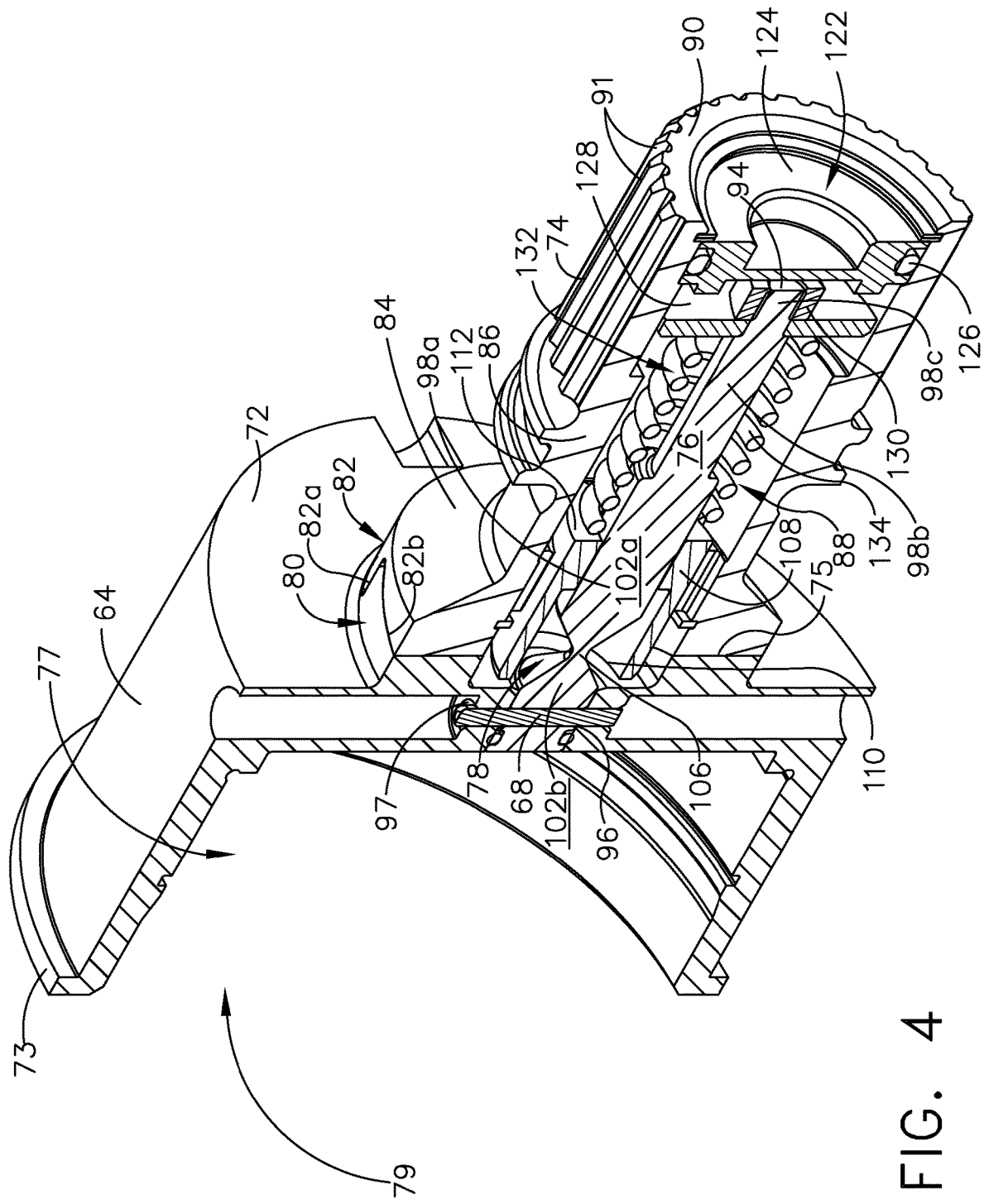
FIG. 4 is an isometric cross-sectional view of the decoupler assembly of FIG. 2 assembled and in a first position.

Turning to FIG. 3, an exploded view of the decoupler assembly 70 more clearly illustrates the drive hub 64, output shaft 74, and parts within. The drive hub 64 extends from a first end 72 to a second end 73. A face 75 at the first end 72 can define a first set of teeth 80. The first set of teeth 80 includes a tooth portion 80a and a ramped portion 80b. The drive hub 64 can have a hollow interior 77 with the second end 73 having an opening 79 (FIG. 4).

The output shaft 74 includes a second set of teeth 82 extending from a first end 84. The second set of teeth 82 includes a tooth portion 82 a having a height (H) and a ramped portion 82 b having an arc length (A). The second set of teeth 82 are configured for mating with the first set of teeth 80. The ramped portions 80 b, 82 b can be, in non-limiting examples, inclined portions, an angled portions, or otherwise oriented portions of the first and second set of teeth 80, 82 to enable engagement in one rotational direction. While six teeth are illustrated, more or less teeth are contemplated.

Figure 6A:
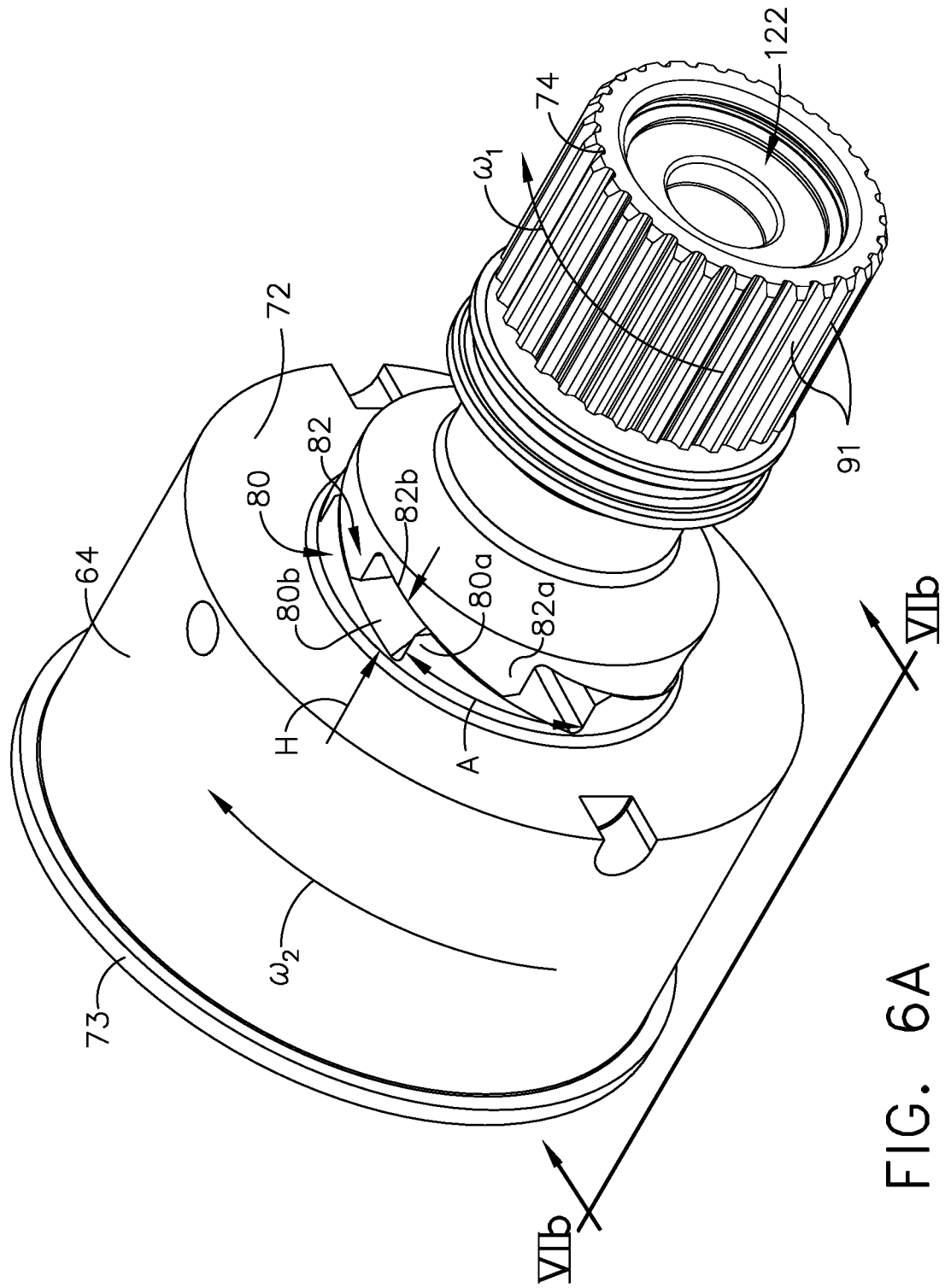
FIG. 6A is an isometric view of the decoupler assembly of FIG. 2 in an intermediate position.

The second set of teeth 82 circumscribe a cylindrical body 86 of the output shaft 74 at the first end 84. The cylindrical body 86 has an interior 88 and terminates in a second end 90. A series of channels 85 includes a first set of channels 87 circumscribing the interior 88 and a second set of channels 89, by way of non-limiting example there are four channels for each of the first and second set of channels 87, 89 (FIG. 6C). The cylindrical body 86 proximate the second end 90 can include any type of coupling mechanism, by way of non-limiting example a plurality of spline features 91, to couple the output shaft 74 to the AGB 12 or any other suitable portion of an engine. The cylindrical body 86 proximate the second end 90 can be of varying lengths depending on the AGB 12 to which it is coupled.

The shear pin 76 is substantially cylindrical and extends from a first end 92 to a second end 94 with a shear fuse 78 there between. An aperture 96 is located within the shear pin 76 proximate the first end 92 and extends widthwise through the shear pin 76. The shear pin 76 can include stepped cylinders 98a, 98b, 98c each consecutively smaller than the preceding cylinder and extending from the preceding cylinder such that cylinder 98c defines the second end 94. The first cylinder 98a can include a set of slots 100 transversely located about the shear pin 76 and extending lengthwise along a portion of the shear pin 76. More specifically, the set of slots 100 extend along the length of the first cylinder 98a.

A cone 102a having a tip 104a extends from the first cylinder 98a. A second cone 102b can extend away from the first end 92 of the shear pin 76 and terminate in a tip 104b. The tips 104a, 104b meet at a point 106 to define the shear fuse 78. While illustrated as a meeting of two cones 102a, 102b, it is contemplated that the shear fuse 78 can be any type of shear fuse 78, by way of non-limiting example any shear fuse, capable of shearing or breaking under a given torque.

A sheath 108 can also be included in the decoupler assembly 70 and have a body that extends from a first end 110 to a second end 112. The body can be a substantially cylindrical body 114. The sheath 108 can be hollow such that the shear pin 76 can pass through the sheath 108. The sheath 108, includes a partially cut out portion to better illustrate a set of ribs 116, while one rib 116 is illustrated, it is contemplated that the set of ribs 116 is a plurality of ribs 116 provided circumferentially along an interior surface 118 of the cylindrical body 114. At least one sheath tab 120 is included on the second end 112 of the sheath 108. By way of non-limiting illustration, by way of non-limiting example four sheath tabs 120 have been illustrated as circumscribing the second end 112.

When assembled it is contemplated that the set of ribs 116 is received in the set of slots 100 such that the shear pin 76 is configured to be rotationally locked within the sheath 108. It is further contemplated that the set of ribs 116 can be located along the shear pin 76 and the set of slots 100 can be located along the sheath 108. Regardless of their location, the set of slots 100 and the at least one rib 116 are complementary to each other. Further, the ribs and slots can have any suitable profile, shape or contour regardless of their location.

Turning to FIG. 4, an assembled partially cutaway isometric view of the decoupler assembly 70 is shown and it can more clearly be seen that a retaining pin 68 extends through the aperture 96 into corresponding apertures 97 within the drive hub 64. The retaining pin 68 thus couples the shear pin 76 to the drive hub 64 and rotationally fixes the shear pin 76 within the drive hub 64. The retaining pin 68 is configured such that it is perpendicular to the set of slots 100 and the set of ribs 116.

The interior 88 of the output shaft 74 further includes an O-ring assembly 122 proximate the second end 90 of the output shaft 74. The O-ring assembly 122 includes a cap 124 and an O-ring 126. A retainer 128 can be located within the output shaft 74 immediately aft the O-ring assembly 122. The retainer 128 can include a nut 130 in which the cylinder 98c of the shear pin 76 is received. In this manner, the cylinder 98c can be a threaded portion of a bolt such that the retainer 128 and shear pin 76 are, by way of non-limiting example, coupled via a nut and bolt assembly.

A blocking mechanism 132 can include the sheath 108, shear pin 76 and a biasing mechanism, by way of non-limiting example a compression spring 134 is illustrated in an expanded position. The compression spring 134 extends between the retainer 128 and the second end 112 of the sheath 108. It is further contemplated that the blocking mechanism 132 can include a magnet assembly or second compression spring integral with the sheath 108 and/or output shaft 74 to bias the output shaft 74 away from the sheath 108.

When assembled, the sheath tabs 120 are pressed against the second set of channels 89 by the compression spring 134 such that the orientation of the sheath tabs 120 (FIG. 3) are proximate the set of channels 87 (FIG. 3). In this position, the compression spring 134 is held in compression by the sheath 108 and the retainer 128.

Figure 5:
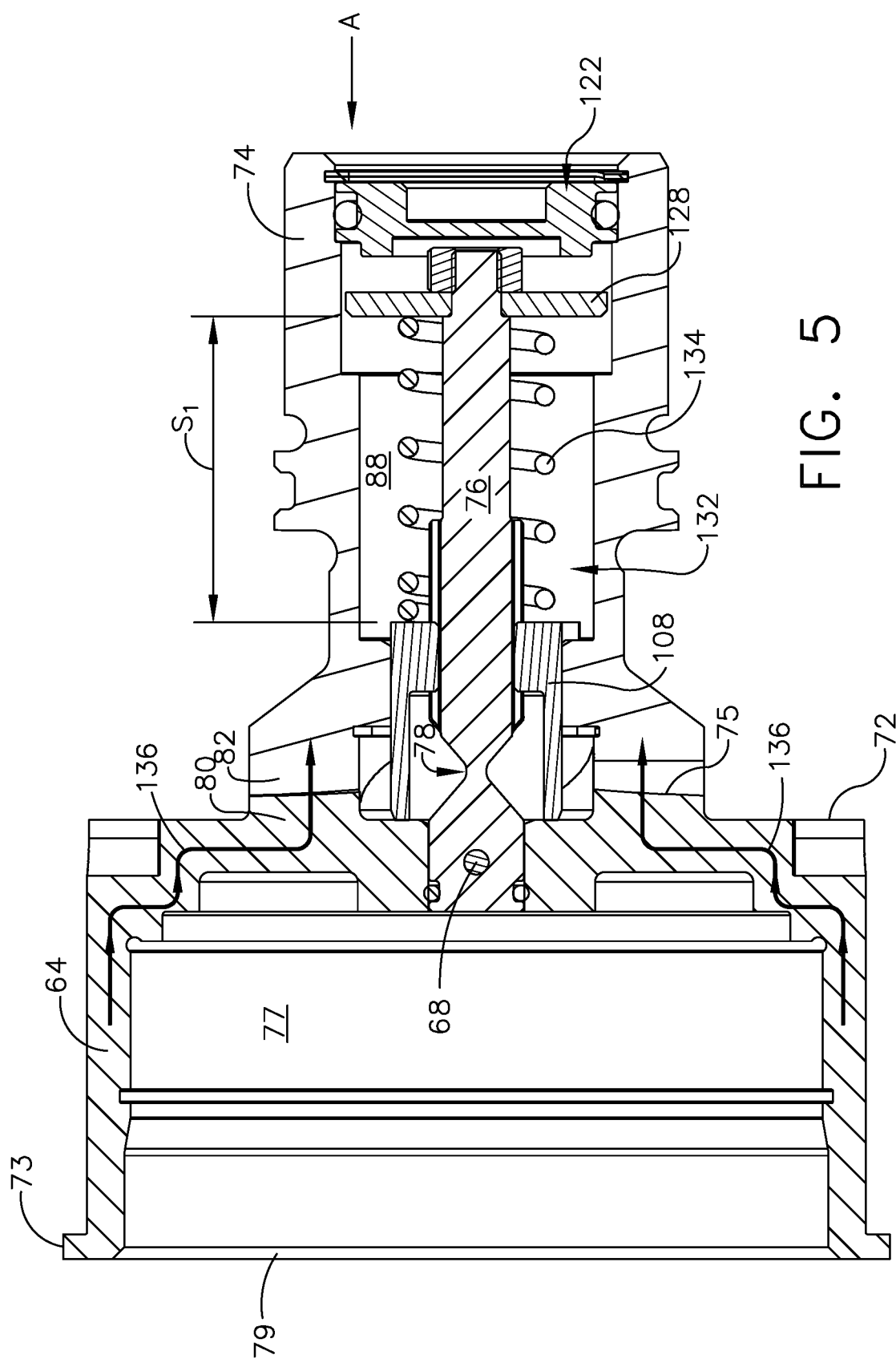
FIG. 5 is a cross-sectional view of the decoupler assembly of FIG. 4.

Under normal operating conditions, as illustrated in FIG. 5, torque is transmitted to the AGB 12 through the drive hub 64 and the output shaft 74 via the first and second set of teeth

80, 82. Normal operating conditions can include, but are not limited to, engine start operations or motoring when the air turbine starter 10 drives the engine 14. In this case, when viewed in direction A, the torque is transmitted when the drive hub 64 is rotating in a clockwise direction. A load path 136 for the torque transmission is through the drive hub 64 and output shaft 74. The retaining pin 68 is not loaded. The compression spring 134 is in a first position (S1).

When the air turbine starter 10 is driving the engine 14, the engine 14 can pick up speed when combustors are fired at any given specific engine speed range. In a back drive situation, the output shaft 74 is turning in a clockwise direction at a faster rate ($\omega_1$) than the drive hub rate ($\omega_2$) causing the output shaft 74 to pull away from the drive hub 64 as is illustrated in FIG. 6A. When a reverse torque occurs the first and second set of teeth 80, 82 slide over each other translating and rotating the output shaft 74 away from the original position relative to the drive hub 64. Upon rotating a distance of the arc length (A), the output shaft 74 will be axially translated from the drive hub 64 in an amount equal to the height (H).

Figure 6B:
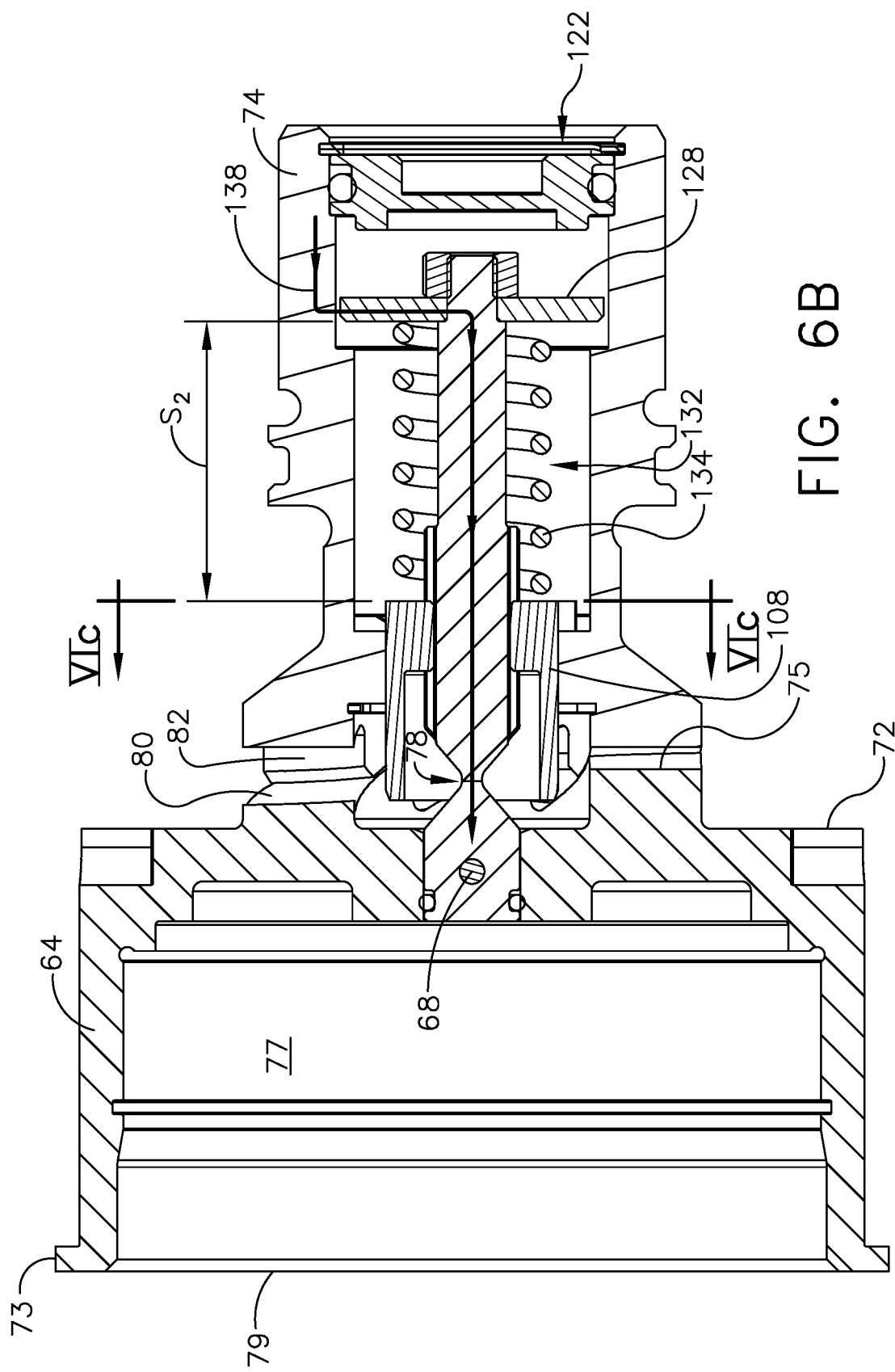
FIG. 6B is a cross-sectional view along line VIb-VIb of the decoupler assembly of FIG. 6A.
Figure 6C:
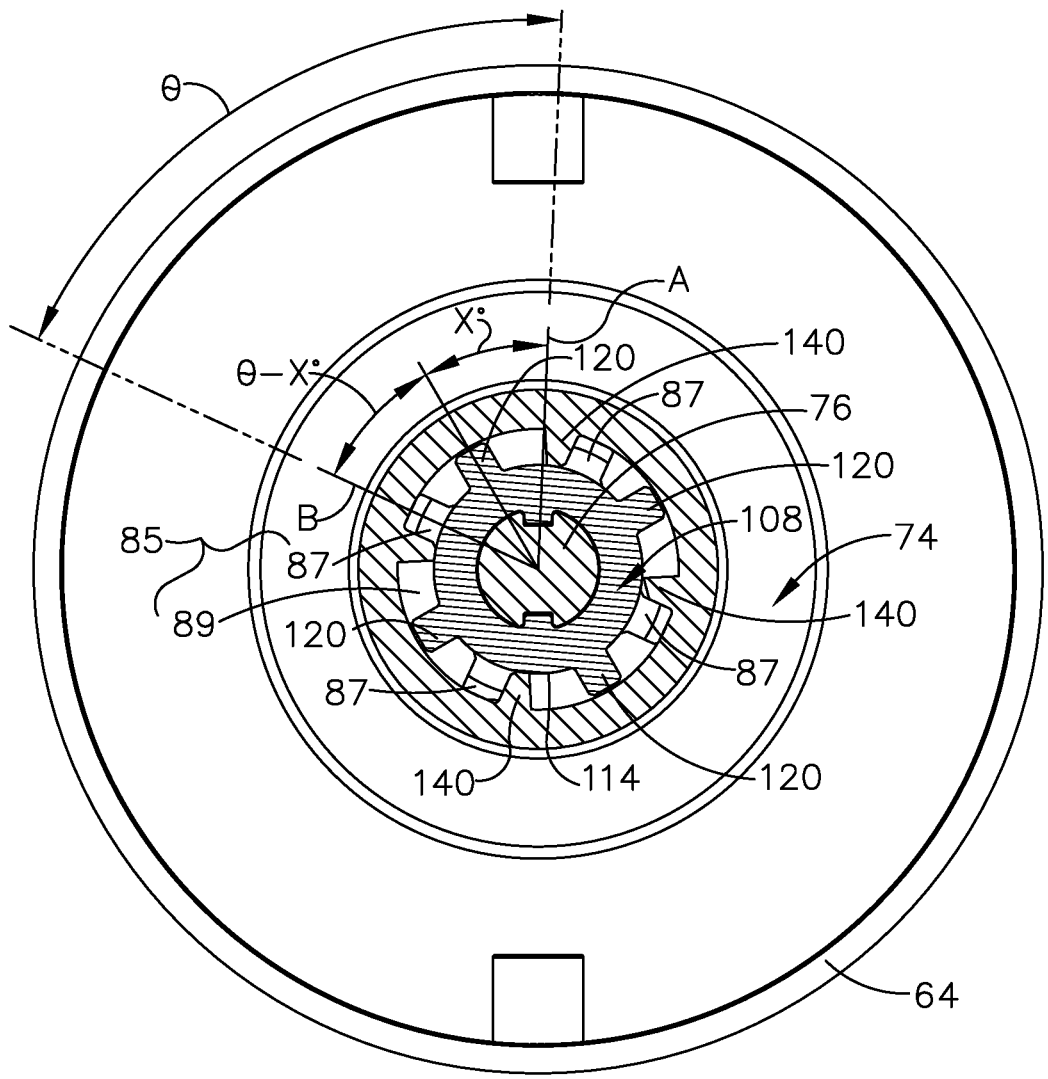
FIG. 6C is a cross-sectional view of the decoupler assembly of FIG. 6B along a line VIc-VIc.

Likewise as can be seen in FIG. 6B, the compression spring 134 will in turn be compressed the same amount (H) until the teeth 80, 82 slide beyond an arc distance (A) and the output shaft 74 is allowed to move back towards the drive hub 64. The compression spring 134 begins to compress further to a second position (S2).

In this exemplary situation, the engine 14 is about to back drive the air turbine starter 10. A load path 138 is now in an opposite direction and passes through the retaining pin 68 to the drive hub 64. In this direction, the first and second set of teeth 80, 82 will not engage with each other, but the output shaft 74 and the drive hub 64 are still coupled.

Turning to FIG. 6C, a view of the sheath 108, drive hub 64, and output shaft 74 taken along section VIc-VIc from FIG. 6B illustrates an intermediate position of the output shaft 74 relative to the sheath tabs 120 between a first rotational orientation (A) and a second rotational orientation (B). Under normal operating conditions the sheath tabs 120 within the second set of channels 89, which can define a semi-circular lip portion where each channel 89 is defined at each end by a drive tab 140. The sheath tabs 120 can sit next to the first set of channels 87, within the first set of channels 89 while being held by the drive tab 140 at the first rotational orientation (A). Each drive tab 140 forms an angle $\Theta$ with the set of channels 87 between the first orientation (A) and the second orientation (B). When the engine 14 begins to back drive the output shaft 74 turns in a clockwise direction relative to the sheath 108 through an angle X°. This begins to close the angular distance between the set of channels 87 and the sheath tabs 120 to an amount of ($\Theta$–X°).

Compression of the compression spring 134 can cause frictional resistance between the corresponding first and second set of teeth 80, 82. This resistance to engine back torque can be proportional to a spring stiffness of the compression spring 134 and the amount of axial translation (H). As the teeth 80, 82 continue to slide the resistance grows until the torque reaches a disengagement torque associated an angular distance (X°). $\Theta$ This will cause the sheath tabs 120 to slip, disengaging the engine 14 from the starter 10. The sheath tabs 120 will not move through an angle $\Theta$ unless the disengagement torque is greater than the spring stiffness of the compression spring 134.

Turning to FIG. 7A, during a failure event, such as when the clutch is inoperable, the retaining pin 68 becomes loaded in torsion. The load increases until the shear pin 76 shears at the shear fuse 78 causing the output shaft 74 to become disengaged from the drive hub 64. The compression spring 134 is allowed to expand from the second position (S2), a retracted position, to a fully expanded position (S3) and in turn pushes the sheath 108 causing the output shaft 74 to move further away from the drive hub 64 such that the two shafts 64, 74 are fully disengaged.

Figure 7B:
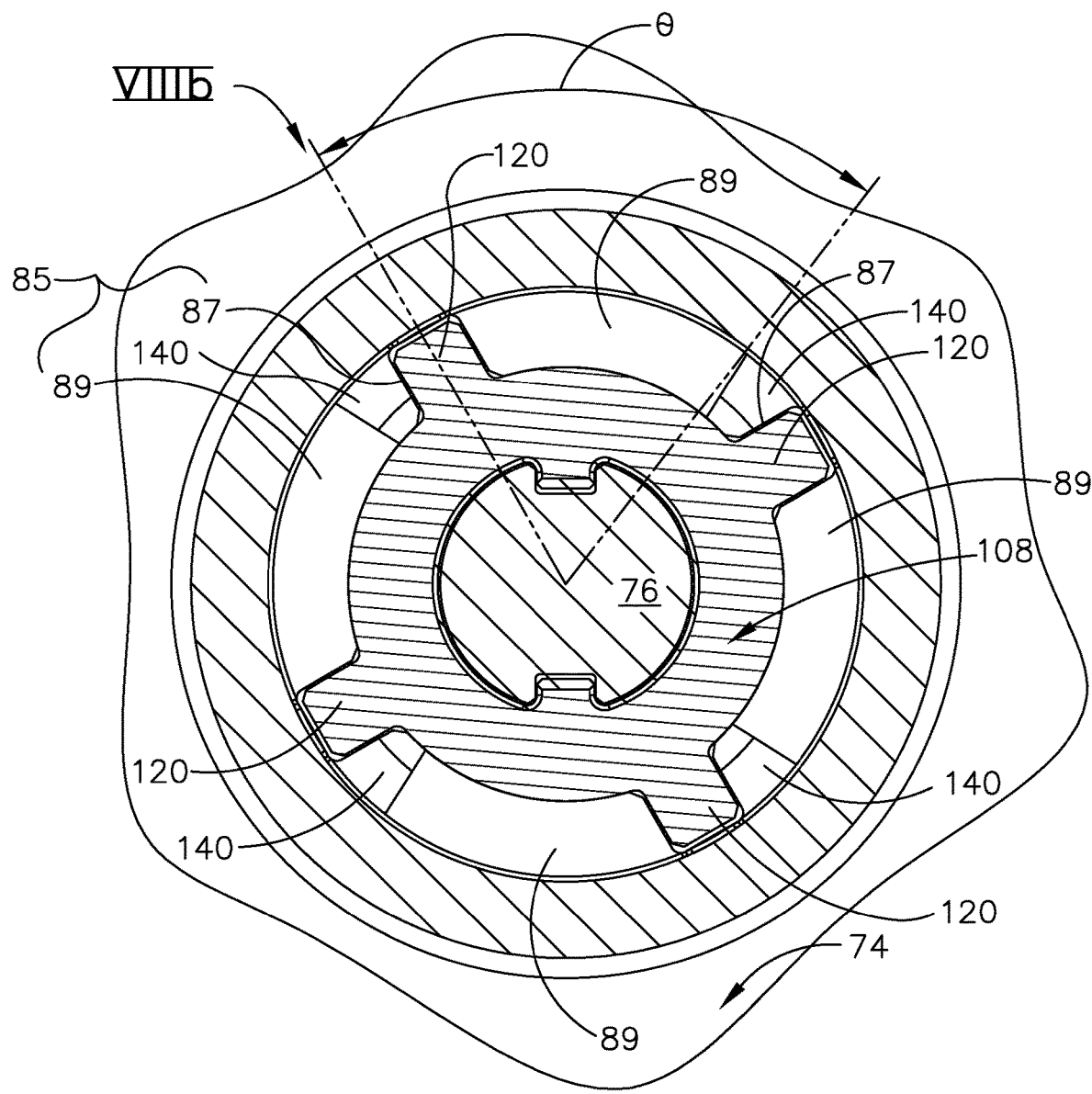
FIG. 7B is a cross-sectional view of the decoupler assembly of FIG. 7A along a line VIIIb-VIIIb.

Furthermore, as can be seen in FIG. 7B, during the failure event described herein, the output shaft 74 turns through a full angle $\theta$ and the maximum disengagement torque has been reached. The series of channels 85 functions together during a failure event. At the second rotational orientation (B), the slider tabs 98 slide along the second set of channels 89 and meet the first set of channels 87 such that the slider tabs 98 fall into the corresponding first set of channels 87. Upon falling into the first set of channels 87, the compression spring 134 is allowed to move into the fully expanded position (S3) (FIG. 8A) enabling a full disengagement of the drive hub 64 and the output shaft 74. The blocking mechanism 132 is configured to bar the output shaft 74 from operably coupling with the drive hub 64 after the shear fuse 78 is sheared.

Advantages associated with the decoupler assemblies described herein include minimizing the possibility of unintentional re-engagement of the output shaft. This includes preventing undesirable back driving of the starter for a turbine engine. By preventing back driving, wear to the parts described herein, in particular the drive hub and output shaft decrease. Decreasing wear in turn increases the life of the parts. The decoupler assemblies as described herein enable lower maintenance cost and easy repair.

The sheath together with the compression spring prevents any re-engagement of the sets of teeth during a main clutch failure condition avoiding possibility of engine driving the air turbine starter. The sheath is a multifunction component. First, it locks the fuse in torsion during the main clutch failure. Second, it acts as a pusher to separate the output and drive hub apart. A single compression spring is used to push the output and drive hub apart along with locking the sheath between the slotted ring face and the fuse.

Use of minimum parts increases reliability, lowers cost, and lowers weight of the decoupler assembly as described herein when compared to current decoupler mechanisms.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Moreover, while "a set of" various elements have been described, it will be understood that "a set" can include any number of the respective elements, including only one element. Combinations or permutations of features described herein are covered by this disclosure. Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter for starting an engine, comprising:
   a housing defining an inlet, an outlet, and a flow path extending between the inlet and the outlet for communicating a flow of gas there through;
   a turbine member journaled within the housing and disposed within the flow path for rotatably extracting mechanical power from the flow of gas;
   a gear train drivingly coupled with the turbine member;
   a drive train operably coupled with the gear train and configured to provide a rotational output; and
   a decoupler assembly, comprising:
      a drive hub operably coupled to the drive train and having a first set of teeth;
   an output shaft having a first end having a second set of teeth configured to mate with the first set of teeth and a second end selectively operably coupled to the engine, the second set of teeth allow for driving torque transfer from the drive hub to the output shaft and the second set of teeth slide on the first set of teeth when back driving torque is transmitted such that the output shaft is moved axially away from the drive hub;
      a shear pin operably coupled at a first end to the drive hub, where the shear pin and the drive hub include corresponding apertures and a retaining pin is located in the corresponding apertures, and operably coupled at a second end to the output shaft and having a shear fuse;
      one of a set of ribs or a set of slots located along at least a portion of the length of the shear pin;
      a sheath surrounding at least a portion of the shear pin and axially moveable along a portion of the shear pin;
      a load path for torque transmission through the drive hub and output shaft occurs during normal operating conditions; and
      a load path for torque transmission through the output shaft and the shear pin via the sheath occurs during a failure event;
      wherein the retaining pin is located perpendicular to the one of the set of ribs or the set of slots.

2. The air turbine starter of claim 1 wherein an interior of the sheath includes another of a set of ribs or a set of slots complementary to the set of ribs or the set of slots of the shear pin such that the shear pin is configured to be rotationally locked within the sheath.

3. The air turbine starter of claim 2 wherein the set of slots are transversely located about the shear pin and the set of ribs are located within an interior of the sheath.

4. The air turbine starter of claim 1 wherein the sheath is rotationally moveable between a first rotational orientation and a second rotational orientation.

5. The air turbine starter of claim 4 wherein the sheath is moved to the second rotational orientation during the failure event.

6. The turbine starter of claim 1 wherein the shear pin is loaded from the output shaft via the sheath during the failure event and loading past a threshold shears the shear fuse.

7. The air turbine starter of claim 6, wherein a blocking mechanism comprising at least the sheath and shear pin, is configured to bar the output shaft from operably coupling with the drive hub after the shear fuse is sheared.

8. The air turbine starter of claim 6 wherein at least one sheath tab extends radially from the sheath and the output shaft is in an intermediate position with the at least one sheath tab located between a first and second rotational orientation.

9. The air turbine starter of claim 7 wherein the blocking mechanism further comprises a biasing mechanism moveable between a retracted position and an expanded position where the biasing mechanism is configured to bias away the output shaft from the sheath.

10. The air turbine starter of claim 9 wherein the biasing mechanism is a compression spring.

11. An air turbine starter for starting an engine, comprising:
    a housing defining an inlet, an outlet, and a flow path extending between the inlet and the outlet for communicating a flow of gas there through;
    a turbine member journaled within the housing and disposed within the flow path for rotatably extracting mechanical power from the flow of gas;
    a gear train drivingly coupled with the turbine member;
    a drive train operably coupled with the gear train and having an output end; and
    a decoupler, comprising:
       a drive hub operably coupled to the drive train and having a first set of teeth;
    an output shaft defining an interior and having a first end having a second set of teeth configured to mate with the first set of teeth and a second end selectively operably coupled to the engine, the second set of teeth allow for driving torque transfer from the drive hub to the output shaft and the second set of teeth slide on the first set of teeth when back driving torque is transmitted such that the output shaft is moved axially away from the drive hub;
       a shear pin at least partially located within the interior of the output shaft and having a first end operably coupled to the drive hub and a second end housed within the interior of the output shaft and having a shear fuse;
       a sheath at least partially located within the interior of the output shaft and having a first end adjacent the drive hub and a second end mating with a portion of the shear pin and through which the shear pin extends; and
       a biasing mechanism configured to compress during back driving and retain the sheath on the drive hub;
       wherein the during a failure state the output shaft rotates to a second rotational orientation in which the sheath loads the shear pin and further loading results in shearing of the shear fuse.

12. The air turbine starter of claim 11 wherein the sheath is configured to move axially within the output shaft and is pushed towards the drive hub by the biasing mechanism.

13. The air turbine starter of claim 12 wherein the output shaft includes a series of channels in which the sheath is received when output shaft rotates between a first rotational orientation and the second rotational orientation.

14. The air turbine starter of claim 13 wherein the output shaft is moveable to an intermediate position, between the first and second rotational orientations during normal engine overrun.

15. The air turbine starter of claim 11 wherein the shear pin and the sheath have mating spline features.

16. The air turbine starter of claim 11 wherein the biasing mechanism is further configured to bar the output shaft from operably coupling with the drive hub after the shear fuse is sheared.

17. The air turbine starter of claim 11, further comprising a retainer mounted about a second end of the shear pin.

18. The air turbine starter of claim 16 wherein the biasing mechanism includes extends between the second end of the sheath and the retainer.

\* \* \* \* \*